Dec. 8, 1936.  H. K. WHEELOCK  2,063,069
TIRE VULCANIZING APPARATUS
Filed Jan. 16, 1934  3 Sheets—Sheet 3
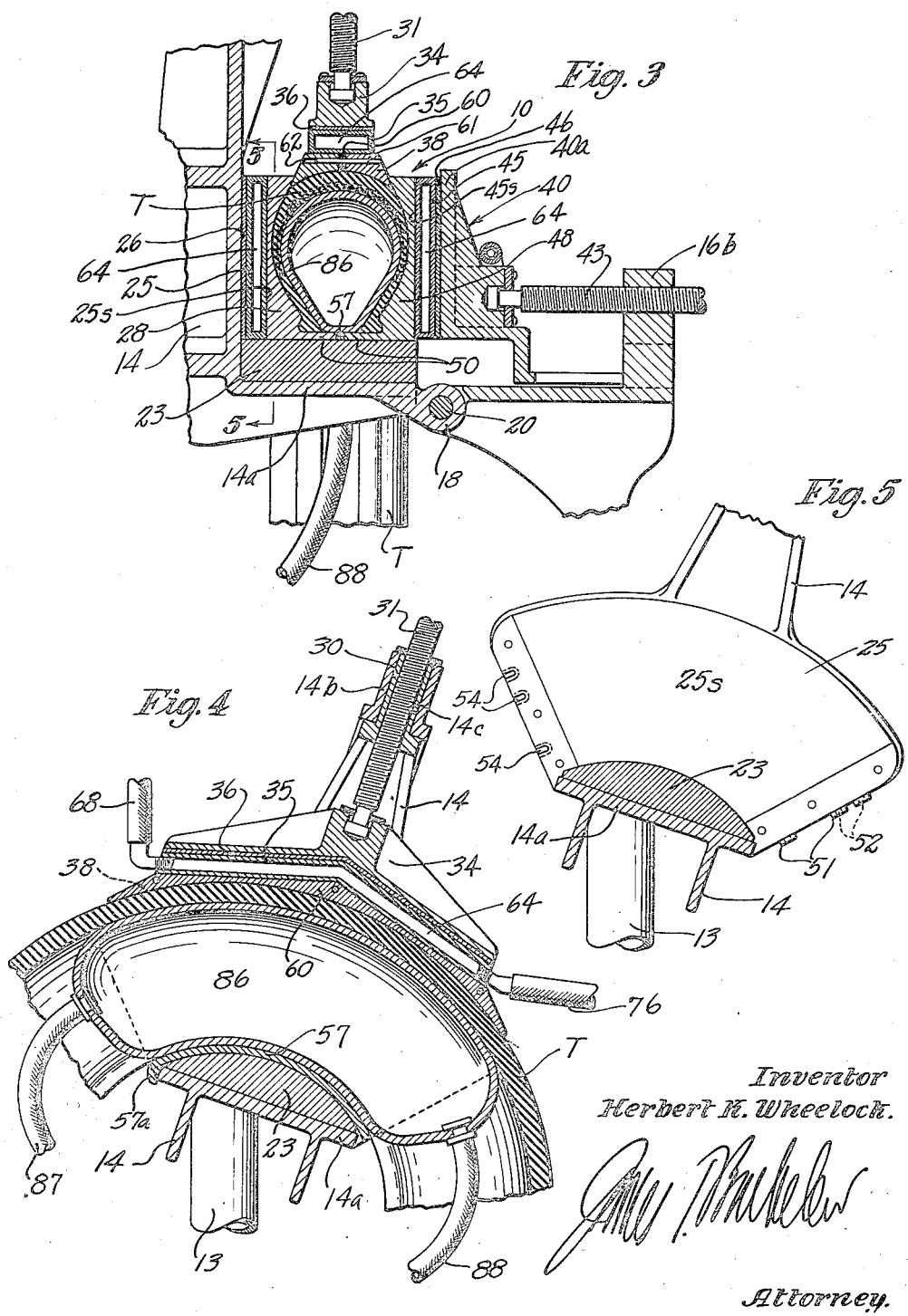
Inventor
Herbert K. Wheelock.
Attorney.

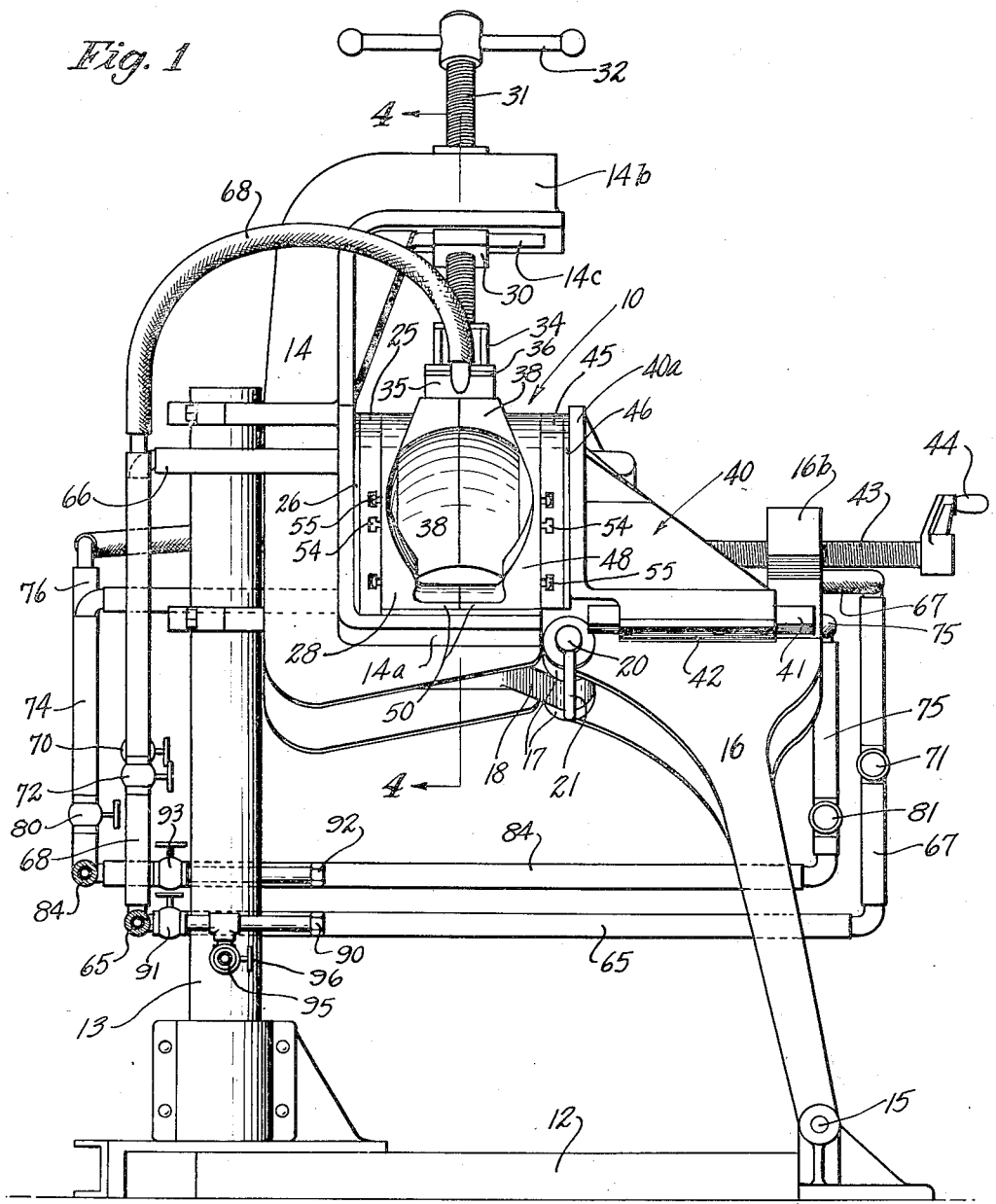

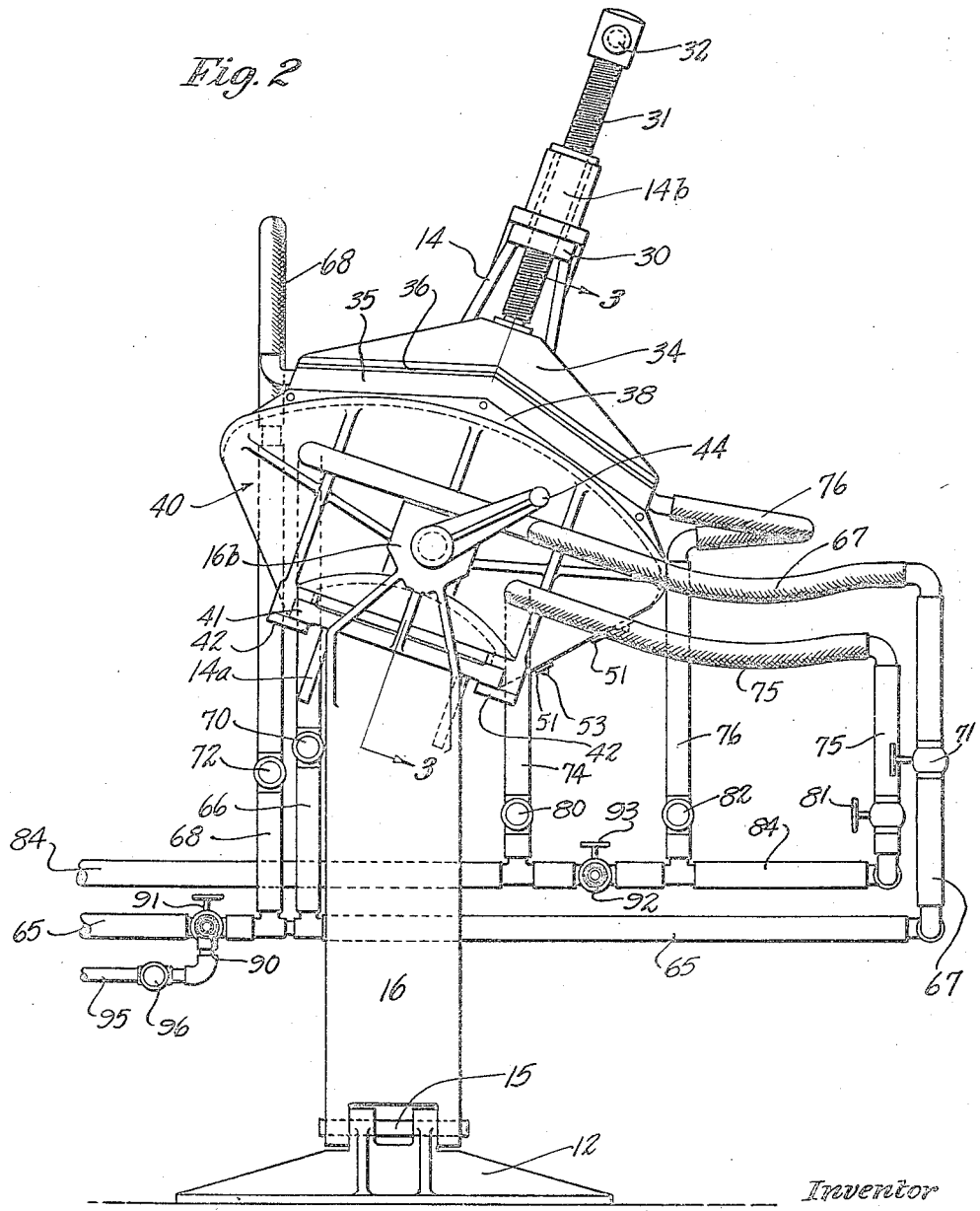

Patented Dec. 8, 1936

2,063,069

UNITED STATES PATENT OFFICE 2,063,069

TIRE VULCANIZING APPARATUS

Herbert K. Wheelock, Long Beach, Calif.

Application January 16, 1934, Serial No. 706,844

8 Claims. (Cl. 18—18)

This invention has to do with apparatus for vulcanizing and retreading tires, and deals in the majority of its aspects with a mold and heating jacket construction in such apparatus.

One of the difficulties heretofore encountered in vulcanizing devices was that the operator has not been able to adequately control the heat applied to the tire in the mold, with the result that all parts of the tire within the mold were subjected to the same maximum temperature and for the maximum length of time required to cure the most difficult spot. The result frequently has been overcuring portions of the tire, or, when the temperature was lowered to avoid overcuring, has been undercuring. Either condition resulted in an unsatisfactory repair job.

Another common failing was the lack of adjustability to satisfactorily accommodate the wide range of sizes encountered in modern tires. Limited range of adjustability in a given vulcanizing machine has required the use of a plurality of machines of different, but frequently overlapping, ranges in order to accommodate all possible sizes. This condition necessitated an unduly large fixed investment. If the machine were not properly adjustable within its range, the tire was held between mold plates of improper configuration to properly fit the tire, and resulted in low-strength repairs and disfigured or deformed tires. Lack of proper adjustability of the mold necessitated forcing the tire to fit the mold, something not possible if the tire was too small, since it could not expand, and that deformed the tire by pressure if the tire was too large. These conditions produced poor repair jobs because improper contact between tire and mold made proper curing impossible; and the attendant mold marks on the tire indicated the poor fit in the mold and consequent likelihood of an unsatisfactory repair. Only by making the mold fully adjustable to the actual size of the tire can proper contact between tire and mold be obtained.

An essential to proper repairing is proper curing. To this end close control of temperature and time of heating is exercised, but it is also necessary that the area of the tire have approximately the same thickness so that uniform conditions prevail throughout the heated portion, otherwise the heat required to cure the thickest portion will over-cure the thinner portions. Because of the greater thickness of the tread, a proper cure for a tread cut will over-cure the side walls if likewise heated, or a proper cure on a side wall repair will under-cure a tread repair. If only the tread need be heated, unnecessary heating of the side walls should be avoided, especially since heating discolors white wall tires and so ruins their appearance.

For these reasons, proper repairing requires that the tread and side walls of the tire segment in the mold be separately and individually heated, so that an entire tread segment may be heated without heating the side walls, or an entire side wall segment alone may be heated.

It thus becomes a general object of the invention to provide an exterior mold so designed as to effect a speedy and efficient heat cure of the tire by the application of localized heat at the proper temperatures to those parts or areas of the tire where the heat is particularly desired. And the invention further contemplates the application of heat to the tire in such a manner with a minimum of heat loss to the atmosphere.

A further object of the invention is to secure accurate and efficient ajustability so that, with a minimum number of tire engaging plates of different shapes and sizes which will accommodate the entire range of tire sizes, at the same time these plates will provide adequate and satisfactory contact with the tire in the mold.

In accordance with the invention I have provided an exterior mold, insulated from heat losses, embodying heating elements arranged to apply heat to the segment of the tire within the mold; and arranged so that, in the event a cure is to be effected locally over an area less than that of the whole segment within the mold, heat may be applied to an entire tread or side wall area alone without necessarily applying heat to the entire surface of the tire segment. The invention may be characterized, as regards the exterior mold construction, as comprising an arrangement of outer walls, each having a layer of heat insulating material, disposed at the sides and tread surface of the tire, and within which are heating elements to which steam may be supplied selectively. The heat is transmitted to the tire through heat conducting liners placed between the tire and the outer mold, these liners being shaped to conform closely with the outside of the tire under treatment.

The outer mold is formed in sections, relatively movable to secure proper adjustment to the tire, and preferably with a pair of sections at opposite sides of the tire and a third at the outside of the tread surface. Each of these sections comprises a layer of heat insulating material, typically and preferably wood, next to which is carried a heating element adapted to contact a correspondingly positioned liner. The heating elements are formed as metal walled steam chambers insulated from the walls and frame by the layers of insulating material, and having heating surfaces exposed to the inner faces of the mold. The steam supply to the heating elements is selectively controllable, that is, steam may be supplied to any one or all of the heating elements.

The liners comprise a pair of side plates carried by opposing outer walls and adapted to contact the side walls of the tire, and a tread plate carried by the third mold section in a position to contact the tire tread. These liners contact the tire so as to confine and shape it as well as transmit heat to it. The side plates contact the tread plate along a plane surface, preferably inclined, so that the several liners remain in contact though movable toward and away from each other to accurately conform to the tire within the mold.

In addition to the exterior mold of the character described, I preferably provide a flexible steam bag for insertion within the section of the tire to be treated. The steam bag is utilized primarily for the purpose of exerting an internal pressure within the tire so as to force the latter into pressural engagement with the liners. Since steam may be employed as the expansive medium within the bag, this steam conveys heat to the interior of the tire. The steam admitted to the bag may be at the same or different pressure than that used in the exterior mold, and, in any event, is separately controllable. If the heating effect of steam is not desired, compressed air may be introduced into the bag to exert the desired pressure.

Although my invention is particularly adapted to a vulcanizing apparatus for treating only a segment of a tire, and I have chosen to illustrate and describe it in this particular embodiment, yet it will be realized that many features of the invention may be extended to and embodied in a full circle mold of the type used in retreading or manufacturing tires.

Having set forth certain of the general objects and characteristics of my invention, I shall now proceed to a detailed description of a typical and illustrative form of the invention, from which the above and additional features and advantages of the invention will be more fully understood. Reference is had to the accompanying drawings in which:

Fig. 1 is a side elevation of a vulcanizing apparatus constructed in accord with my invention;

Fig. 2 is an end elevation of the vulcanizing apparatus, as viewed from the right in Fig. 1;

Fig. 3 is a fragmentary section on line 3—3 of Fig. 2 showing a tire within the mold;

Fig. 4 is a fragmentary vertical section on line 4—4 of Fig. 1 showing a tire in the mold; and Fig. 5 is a fragmentary elevation of a side heating element with the liner removed, as indicated by arrows 5—5 in Fig. 3.

Referring particularly to Fig. 1, it will be seen that the vulcanizing apparatus comprises a mold assembly indicated generally at 10 supported by a frame structure. This frame includes a base 12 carrying fixed standard 13 which supports yoke member 14. Pivotally mounted on base 12 at the end opposite standard 13 by means of pin 15 is swinging frame member 16. Frame member 16 is provided with bosses 17 and yoke 14 has a boss 18, these bosses being provided with longitudinal bores which, when frame member 16 is swung into the position of Fig. 1, move into alinement to receive locking pin 20 to lock member 16 and yoke 14 against relative movement. Pin 20 is provided with a handle 21 to facilitate inserting and removing the pin. As will become evident from the later description, yoke 14 supports two sections of the mold and swinging frame member 15 supports the other section.

The stationary side section of the mold is carried by yoke 14 which acts as a wall to support and strengthen the mold section. As may be seen from Figs. 3 and 5, the lower horizontally extending portion 14a of the yoke carries block 23 which, for reasons that will become later apparent, is preferably of some thermally insulating material and has a convex top surface. Attached to the yoke just above block 23 is heating element 25 which is separated from the yoke by layer 26 of heat insulating material, typically and preferably wood, so as to insulate the heating element from direct metallic contact with the yoke which would cause excessive heat losses through conduction. Although any other insulating material may be used, the steam temperatures used are within a sufficiently low range to permit the use of wood which is cheap and easily handled. As may be seen from Fig. 5, heating element 25 is provided with an exposed, plane surface 25s against which is placed in heat conducting contact a side liner 28. The back face of liner 28 is also a plane surface adapted to fit snugly against surface 25s.

Referring again to Fig. 1, it will be understood how the tread section of the mold is mounted on the upper arm of yoke 14. A horizontally extending portion 14b at the top of yoke 14 is provided with a way 14c within which screw block 30 is adapted to slide; and screw 31, turned by means of handle 32, is threaded through block 30 so as to slide longitudinally of way 14c with block 30. Thus the mold section carried on the lower end of screw 31 may be moved vertically by turning handle 32 to rotate screw 31 in a proper direction, and may be moved horizontally by sliding block 30.

The tread mold section is connected to the lower end of screw 31 by a swivel connection best illustrated in Figs. 3 and 4. This mold section comprises a back wall or plate 34 preferably formed at its under side with two plane surfaces intersecting at an obtuse angle as illustrated in Fig. 4. Heating element 35 is insulated from heat conducting contact with back plate 34 by means of a layer of insulating material 36, preferably of the same material as layer 26. Heating element 35 is conveniently of substantially rectangular cross section so that it presents a downwardly facing surface formed of two plane surfaces intersecting at an obtuse angle. This surface is adapted to fit in heat conductive contact with an upwardly facing, complementary surface on the top of tread liner 38.

The third mold section is a side section mounted upon travelling base block 40 which is slidably mounted upon member 16 of the vulcanizer frame. Frame portion 16 is provided at either side with a longitudinally extending guide boss 41 (Fig. 1); and the sides of travelling block 40 overhang these bosses so that by attaching plates 42 to the overhanging sides of the travelling blocks there are formed channels, one on each side of block 40, adapted to receive guides 41. The front side only of the apparatus is disclosed in Fig. 1, but it will be understood that the back side is constructed in the same manner. An extension 16b on frame portion 16 is provided with a threaded bore to receive screw 43 which may be rotated by handle 44 at its outer end. The inner end of screw 43 is secured to block 40 by means of a swivel connection shown in Fig. 3. By turning handle 44 screw 43 is rotated to draw block 40 backwards or forward along guides 41 so that proper horizontal adjustment of the mold section may be easily secured.

This movable mold section comprises a heating element 45, a layer 46 of insulation between the heating element and wall 40a of block 40, and a side liner 48 adapted to be heated from the heating element by contact with the element surface 45s, all these parts being arranged and constructed in the same manner as in the stationary mold element previously described.

The liners 28, 38 and 48 are made of aluminum or an aluminum alloy having high heat conductivity. The side liners are arcuately shaped longitudinally to enclose a segment of a tire. The inner or tire engaging surfaces of the side liners extend continuously outwardly and radially over an entire side wall of tire T from the bead to at least the edge of the tire tread, and preferably beyond the tire as will be seen. The bottoms of the liners are provided with flanges 50 which continue the tire contacting surface inwardly underneath the bead of the tire to approximately the tire center line and take the place of a bead plate. The bottom surfaces of the liners conform to the curvature of block 23, while the upper surfaces of flanges 50 are curved to the inside diameter of the tire.

Since any given pair of side liners will accommodate only a limited number of tire sizes, the vulcanizer is provided with several sets or pairs of liners that may be used interchangeably, all these pairs of liners having the same general characteristics except that they are contoured to fit different sizes of tires. Consequently the liners are detachable. In Fig. 5 it will be seen that the back edge of the mold section is provided with a plurality of lugs 51, each lug having a hole 52 adapted to receive a pin 53 (Fig. 2) on the corresponding edge of the liner. The front edge of the mold section is provided with a plurality of T-shaped slots 54 opening to the front and adapted to take the heads of correspondingly positioned bolts 55 on the back surfaces of the liner. Thus a liner may be easily attached in position by placing it in contact with the surface of the heating element and then sliding it rearwardly over the top surface of block 23, i. e. toward the right in Fig. 5, until the liner pins 53 enter holes 52 and bolt heads 55 seat in slots 54. Removal of the liners is accomplished by simply reversing the movement.

A tire may be of such size that the flanges 50 will contact each other as indicated in Fig. 1 However, if tire T is somewhat larger, the situation illustrated in Fig. 3 will occur where flanges 50 are separated by a small space. In order that there may be no gap between these flanges, spacers or fillers 57 are provided of graduated sizes, of which one is shown, to fill in the gap. Spacer 57 lies on block 23, and is provided with a head 57a (Fig. 4) on one end to keep it from sliding out of position.

Tread liner 38 has its lower surface shaped to conform to the tread surface of a segment of tire T; and the top surface of the liner conforms to the heating surface of heating element 35. To adapt the vulcanizer to a wide range of tire sizes, it is likewise necessary to provide a plurality of tread liners of a varying curvature. Although for purposes of illustration, the tread liner is shown in Fig. 1 in its proper relative position without a tire being within the mold, this liner is not here attached to the heating element or back plate 34. The liner is laid on the tire after the tire is placed in the mold and proper adjustment is somewhat easier if the liner is not attached to the heating element, although some suitable attaching expedient might be provided if desired. Tread liner 38 may have a smooth inside surface or it may be provided with the tread design of the tire cast, machined, or otherwise formed upon this surface. The liner here illustrated is without any tread design.

It is desirable that the tread liner be adjustable to tire treads of different widths. In my preferred form, this is attained by dividing the tread liner along a vertical median plane into two halves, and by inserting spacer 60 (see Fig. 3). Spacers 60, of which one is shown, may be furnished in varying thicknesses, and one or more said spacers may be placed between the two halves of the liner to spread the halves to properly fit a tread of greater width than would be accommodated by the liner alone. Although the halves of the liner may be held together by any suitable means, a convenient one is illustrated in Figs. 3 and 4. One half of liner 38 is provided with a plurality of dowel pins 61 which are received within an equal number of correspondingly positioned bores 62 in the other half of the liner. The halves of the liner are thus separable and horizontally adjustable; and spacer 60 is provided with suitable holes through which dowel pins may pass to enter bores 62, thus holding all the parts of the liner together as a unit.

It is seen that the mold presents a substantially unbroken surface to the tire so that there will be no mold marks on the repaired tire. The only breaks occur at the edge of the tread when the tread liner contacts the side liner; but by having the inner surface of the tread liner intersect the inner surfaces of the side liners along the corner formed by the intersection of the tire tread and side walls, these breaks in the mold do not contact tire surfaces and cannot mark the tire.

From Fig. 3, it will be seen that each of the heating elements is hollow to form within the element a steam chamber 64; and as will now be explained, each of these steam chambers is separately suppliable with live steam. The source of steam is not illustrated, but it may be any suitable boiler or other source adapted to provide a suitable quantity of live steam at the desired pressure. Steam is brought from the boiler by main feed pipe 65 which has a series of valve controlled laterals or branches 66, 67 and 68 which lead respectively to the steam chambers in side heating elements 25 and 45 and tread heating element 35. Inlet valves 70, 71 and 72 are placed respectively in these branch pipes so that steam may be selectively admitted to any one or more of the heating elements as desired.

Outlets from the steam chambers of heating elements 25, 45 and 35, respectively, are afforded by return pipes 74, 75 and 76, which pipes are likewise controlled by individual outlet valves 80, 81 and 82, respectively. These three return lines connect with the main return pipe 84 which leads condensate back to the boiler.

All these steam lines are preferably covered with some kind of lagging or insulation to reduce heat losses by radiation. Also, steam lines leading to and from the movable side and tread mold sections include a length of flexible hose in order to permit free movement of these mold sections.

For the purposes of pressing the tire outwardly against the surfaces of the mold and also to introduce steam to the interior, there is placed within tire T a flexible steam bag 86, as illustrated in Figs. 3 and 4. This bag is made of rubber or rubber-fabric composition and has its ends especially reenforced so that it may hold a substantial pressure. At the ends of bag 86 are placed flexible hose lines 87 and 88 which serve as an inlet and outlet respectively for the steam. The free end of hose 87 is provided with a coupling which, after the tire is properly in the mold, is connected to an outlet 90 on feed line 65 in order to convey steam to the bag. Valve 91 is provided to control the flow of steam through outlet 90 and hose 87. The free end of hose 88 is likewise provided with a screw coupling by which the hose is attached at 92 to the return pipe 84. Outlet valve 93 is provided to control flow through hose 88.

Under some circumstances it may be desired to introduce into steam bag 86 steam at a higher pressure and temperature than is used in the heating elements of the mold section. If such is the case, a suitable separate boiler or other source of steam will be provided; and it will be understood without further description that the boiler may be provided with feed and return pipes leading to the vulcanizer, and that hoses 87 and 88 may be coupled with such pipes, thus affording the steam bag an independent source of steam supply.

After the tire has been thoroughly heated and the material softened enough to effect a proper repair, it is customary to leave the tire in the mold for a considerable length of time to cure. During such time it may be desired to maintain a high pressure within the steam bag but without the high temperature accompanying steam at that pressure. Under such circumstances it is customary to introduce compressed air into the steam bag. For this purpose there is provided compressed air line 95 leading to connection 90, where the steam bag hose 87 is attached, but separated from steam feed pipe 65 by valve 91. The flow of compressed air is controlled by means of valve 96. By closing outlet valve 93, to prevent flow from the air bag into steam return line 84, and by closing valve 91, to prevent communication between compressed air line and steam feed line 65, the steam bag is made ready for the introduction of compressed air by opening valve 96. With this arrangement of steam and air supply lines, it is not necessary to change any of the connections, but only to manipulate three valves in order to cut off the steam and introduce compressed air into the steam valve. In this manner relatively high pressures, for example in the vicinity of 125 lbs. per sq. in., may be introduced into the steam bag but without the necessity of also having the temperature produced by steam at that pressure which is so high as to overheat the tire during the curing period.

Reference to Fig. 2 indicates that the mold portion of the vulcanizer has been tilted backwardly or to the right as viewed in that figure, thus making manipulation by the operator somewhat easier, and, more particularly, by inclining the longitudinal axes of the steam chambers providing a distinct drainage through the several steam chambers 64 and steam bag 86. Steam inlets to these elements are at the high end while the outlets are at the low end so that all condensate will drain downwardly to the low point in these steam receptacles and will return through the outlet lines to the boiler.

When placing the tire in the mold, the movable mold sections are first retracted and side liners of the proper size are placed in position. Pin 20 is then withdrawn and frame 16 is swung back, that is, to the right in Fig. 1, about pin 15 so that a tire may be placed over yoke portion 14a and into the mold. Frame 16 carrying travelling block 40 is then swung forwardly to proper position and pin 20 reinserted to hold the parts against relative movement. Spreaders 60 and 57 are inserted above and below the tire if necessary. Tire liner 38 is then placed on the tread and the side mold section advanced by means of screw 43 until the tire is firmly engaged by the several liners. Back plate 32 is lowered by turning screw 31 to apply pressure and heat to tread liner 38.

The side faces of tread liner 38 are inclined to the vertical, and the upper portions of the inside surfaces of side liners 28 and 48 above the tire tread are similarly inclined so as to extend somewhat tangentially of the tire side walls. The side liners extend radially of the tire sufficient distance so that the inclined faces come in contact with the inclined sides of tread liners 38 to securely and completely surround and engage the enclosed tire. By so inclining these surfaces, tread liner 38 may move up or down as the side liners are moved away from or toward each other to secure proper adjustment, but at all times the inclined sides of the tread liner are in contact with the upper inside faces of the side liners. The liners are kept continuously in engagement over an appreciable range of distance so that flexibility of adjustment is not interfered with. If the side faces of the tread liner were vertical, and also the corresponding portions of the inside faces of the side liners, then there would be only one position of the side liners which would maintain proper engagement with the tread liner so that even adjustment of the liners to effect proper contact and proper pressure without having any gaps between the liners would be quite difficult, particularly since no two tires are of exactly the same size because of wear and the like.

In the vulcanizing operation, the steam under pressure is put into bag 86 and steam chamber 64 of the heating element, and in general the pressure of the steam will be determined by the amount of compression to which it is necessary to subject the vulcanized areas of the tire in order to effect proper repairing. Typically, a steam pressure of 35 pounds gauge may be used which corresponds to a temperature of 280° F. As before mentioned, it may be desirable to exert a materially greater pressure within the steam bag but not to increase temperature in the heating element. Under such circumstances the steam for the bag may be supplied from a separate source at a higher temperature and pressure.

The nature and extent of the injury will determine the amount of the tire necessarily heated. One, two, or all three of the heating elements may be used as required. It may not be necessary in all cases to turn the steam into all of the heating elements since the particular location of the injured area may require heating only in a localized region. Thus the repair of a side wall cut will necessitate only the use of a single heating element 25 or 45 or perhaps the use of a side element together with a tread element; and the repair of a tread cut will require only heating of the tread liner; but in any event heat is applied from any one element to a portion of the tire of approximately uniform thickness.

Having described a preferred form of my invention, it is to be understood that the foregoing is to be considered illustrative of rather than restrictive upon the broader claims appended hereto, for changes in structure and design may be made without departing from the scope of my invention.

I claim:

1. In apparatus of the character described, a tire mold having tread and side mold sections adapted to enclose a segment of a tire, comprising heat conducting side liners to extend across the tire side walls from beneath the bead to the tread, a heat conducting tread liner to extend entirely across the tread between side liners, a heating element for each liner, and means for applying heat to the heating elements of selected liners to heat a tire segment completely across the tread or completely across a selected side wall.

2. In apparatus of the character described, a mold assembly having tread and side mold sections adapted to enclose a tire, a heating element in each of said sections, side liners interiorly of the side heating elements to engage the sides of the tire, said side liners being adapted to extend radially of the tire from beneath the bead to beyond its tread surface, a tread liner interiorly of the tread heating element to engage the tire tread, the inner surface of the tread liner intersecting the inner surfaces of the side liners at the edge of the tire tread, and means for supplying heat to said heating elements.

3. In apparatus of the character described, a mold assembly having outer tread and side sections adapted to enclose a tire, tread and side heating elements presenting heating surfaces toward the tire, side liners between said side heating elements and the sides of the tire, said side liners extending radially of the tire from beneath the bead to beyond its tread surface, a tread liner between said tread heating element and the tire, said tread liner having inclined side faces contacting complementary inclined faces on the side liners, means for adjustably moving said liners relative to one another, and means for selectively supplying steam to said heating elements.

4. In apparatus of the character described, a mold assembly having outer tread and side sections adapted to enclose a tire, tread and side heating elements presenting heating surfaces toward the tire, side liners between said side heating elements and the sides of the tire, said side liners extending radially of the tire from beneath the bead to beyond its tread surface, a tread liner having inclined side faces contacting complementary inclined faces on the side liners, means to move adjustably the tread mold section vertically and one of said side mold sections horizontally relative to the other sections, and means for selectively supplying steam to said heating elements.

5. A sectional tire vulcanizing mold comprising a base, a fixed frame member on the base, a swinging frame member pivoted to the base, means to lock the said two frame members against relative movement, a side mold section fixed upon the fixed frame member, a second side mold section movably mounted on the swinging frame member, and a tread mold section movably mounted on the fixed frame member.

6. A sectional tire vulcanizing mold comprising a base, a fixed frame member on the base, a swinging frame member pivoted to the base, means to lock the said two frame members against relative movement, a side mold section fixed upon the fixed frame member, a second side mold section mounted for horizontal movement on the swinging frame member, and a tread mold section mounted for horizontal and vertical movement on the fixed frame member.

7. A mold to receive a segment of a tire for vulcanizing, which mold includes separate liners to engage and follow the transverse contour of the side walls of the tire, the adjacent faces of the liners outwardly of the tire engaging portions thereof extending tangential to such portions and in converging relation to each other, another liner to engage the tread portion of the tire disposed between the side liners and having opposed faces slidably engaging said tangential faces of the side wall liners, and means to separately adjust the different liners away from and toward the tire.

8. A tire vulcanizing mold adapted to enclose a segment of a tire, which mold includes side liners for engaging with the side walls of the tire, and a tread liner for engaging with the tread of the tire, said side and tread liners being relatively movable while in the mold and in a tire engaging position, the upper portion of the inner faces of the side liners projecting obliquely upwardly and inwardly and the tread liner having complementary inclined side faces contacting said inner surfaces of the side liners.

HERBERT K. WHEELOCK.